United States Patent
Hassan (10) Patent No.: US 9,986,436 B2
(45) Date of Patent: May 29, 2018

(54) RANDOM PASSWORD FORCED FAILURE

(71) Applicant: Microsoft Technology Licensing, LLC, Redmond, WA (US)

(72) Inventor: Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/265,187

(22) Filed: Sep. 14, 2016

(65) Prior Publication Data

US 2018/0077570 A1    Mar. 15, 2018

(51) Int. Cl.
*H04W 12/06* (2009.01)
*H04L 29/06* (2006.01)
*H04M 1/725* (2006.01)

(52) U.S. Cl.
CPC .......... *H04W 12/06* (2013.01); *H04L 63/083* (2013.01); *H04M 1/72577* (2013.01)

(58) Field of Classification Search
CPC .. H04W 12/06; H04L 63/083; H04M 1/72577
See application file for complete search history.

(56) References Cited

U.S. PATENT DOCUMENTS

| | | | | |
|---|---|---|---|---|
| 5,955,981 A * | 9/1999 | Rangan | ................. | B60R 25/04 307/10.4 |
| 8,347,367 B1 | 1/2013 | Harris | | |
| 8,452,980 B1 * | 5/2013 | Black | ................. | G06F 21/554 713/185 |
| 8,769,607 B1 | 7/2014 | Jerdonek et al. | | |
| 9,280,657 B2 | 3/2016 | Eluard et al. | | |
| 2002/0108046 A1 * | 8/2002 | Armingaud | ............ | G06F 21/31 713/183 |
| 2004/0092248 A1 * | 5/2004 | Kelkar | ................. | H04M 1/67 455/411 |

(Continued)

FOREIGN PATENT DOCUMENTS

CN         105224857 A         1/2016

OTHER PUBLICATIONS

"WebSEAL security policy", Retrieved on: Jul. 8, 2016 Available at: https://publib.boulder.ibm.com/tividd/td/ITAME/SC32-1134-01/en_US/HTML/amweb41_admin07.htm.

(Continued)

*Primary Examiner* — Qun Shen (57) ABSTRACT

A forced failure mode may be activated if a predetermined number of incorrect passwords are received at an apparatus. In forced failure mode, the apparatus determines if a forced failure is to be performed in response to a received password. If a forced failure is to be performed, an access failure is forced. When subsequent passwords are received the determine operation is repeated. When it is determined that a forced failure is not to be performed in response to a password entry, access may be granted if the password is correct, or denied if the password is incorrect. The apparatus may then leave forced failure mode or repeat forced failure mode. The apparatus may be configured in a mobile device and the access attempted may be unlocking of the device. The apparatus may also be configured in a network server and the access attempted may be network access.

10 Claims, 6 Drawing Sheets

(56) References Cited

U.S. PATENT DOCUMENTS

2009/0260065 A1* 10/2009 Kailash ............... G06F 21/316 726/5
2013/0179966 A1* 7/2013 Sawamura ............ G06F 21/31 726/19
2015/0205942 A1* 7/2015 Yang .................... G06F 21/31 726/19

OTHER PUBLICATIONS

Hazel, Philip, "The Exim SMTP Mail Server: Official Guide for Release 4", In Publication of UIT Cambridge, Apr. 1, 2007, 1 page.
"Login Policy", Retrieved on; Jul. 8, 2016 Available at: https://www.icewarp.com/support/online_help/481.htm.
"Zimbra: ZCS Administrator's Guide, Open Source Edition, 6.0.8", Retrieved on; Jul. 8, 2016 Available at; https://www.zimbra.com/docs/os/6.0.10/administration_guide/Configuring%20Mailbox%20Features.10.4.html.
"CPHulk Brute Force Protection", Retrieved on: Jul. 8, 2016 Available at: https://confluence2.cpanel.net/display/ALD/cPHulk+Brute+Force+Protection.
"Configuring Account Lockout Policies", Published on: Jun. 21, 2009 Available at: https://technet.microsoft.com/en-us/library/dd277400.aspx.
"Cisco SCE8000 10GBE Software Configuration Guide, Release 3.7.x", Retrieved on: Jul. 8, 2016 Available at: http://www.cisco.com/c/en/us/td/docs/cable/serv_exch/serv_control/broadband_app/rel37x/swcfg8000_10gbe/swcfg8000_10gbe/Configuring_the_Connection.html#47240.
"International Search Report and Written Opinion Issued in PCT Application No. PCT/US2017/050874", dated Nov. 6, 2017, 12 pages.

* cited by examiner

RANDOM PASSWORD FORCED FAILURE

BACKGROUND

Mobile devices are particularly vulnerable to theft. Mobile device users usually carry their devices wherever they go. They often carry and use their devices in public places, such as in school, in stores and restaurants, or on airplanes. In these situations, their devices may be easily lost or stolen. Also, another person may be able to gain unauthorized access to a user's mobile device for a period of time while the user is otherwise occupied.

A person who has stolen or otherwise has unauthorized access to a user's mobile device may attempt to access data stored on the device by entering a device password. A typical mobile device, such as a smartphone is protected with a four-digit or six-digit password. The person may attempt to use brute force to gain access by repeatedly entering a different password until access is obtained. The longer the time the person has to attempt brute force access, the greater the chances of the person obtaining access. For example, a four-digit password only requires a maximum of 10000 tries to get access (average of 5000 tries). In certain situations, this may be relatively easy to accomplish. It may be even easier if the intruder has knowledge or semi-knowledge of the password.

Additionally, in some mobile devices entry of an incorrect password a certain number of times may lock the device or erase the contents of the device. In situations where another person has unauthorized access to a mobile device for a period of time and could try to unlock the mobile device while the user is otherwise occupied, this could cause loss of use or loss of data for the owner of the mobile device.

SUMMARY

This summary is provided to introduce a selection of concepts in a simplified form that are further described below in the Detailed Description. This summary is not intended to exclusively identify key features or essential features of the claimed subject matter nor is it intended as an aid in determining the scope of the claimed subject matter.

The embodiments of the disclosure include devices, apparatus, and methods that provide use of forced failure for enhanced security during access attempts using a password. In implementations, the forced failure may be configured to force a failure (i.e., deny access) regardless of whether a correct or incorrect password has been received. For example, the forced failure may be set to occur N times during password receipt before a conventional password entry method is activated and an entered password is evaluated for validity. The embodiments may be configured so that a forced failure appears to be the result of an incorrect password entry to an unauthorized person attempting access. This effectively increases the intruder password space significantly when the intruder is using an application program or other methods to attempt access.

An example implementation includes an apparatus that may operate in a forced failure mode for received passwords during access attempts. The forced failure mode may be activated by a user, or automatically activated, for example if a predetermined number of consecutive incorrect passwords are entered during an access attempt. When the apparatus is in forced failure mode, a selected number of access failures may be forced in response to a received password. When a password is received, the apparatus determines if a forced failure is to be performed. If the apparatus determines that a forced failure is to be performed, the apparatus forces an access failure. The apparatus then repeats the receive operation and the determine operation for subsequent passwords received at the apparatus. When the apparatus determines that a forced failure is not to be performed in response to a password entry, the apparatus may grant access if the password is correct, or deny access if the password is incorrect. The apparatus may then leave forced failure mode or may repeat forced failure mode. In an implementation, the apparatus may be configured in a device such as a mobile device and the access attempted may be unlocking of the device. In another implementation the apparatus may be configured in a server controlling access to a network and the access attempted may be network access.

The apparatus may determine if a forced failure is to be performed based on an index that tracks the number of forced failures that have occurred. When a selected number, N, of consecutive forced failures have been performed, the apparatus will determine that a forced failure is not to be performed in response to receiving a password. The apparatus may include a user interface that allows a user or apparatus manager to input a value for the number N. In an alternative implementation, the apparatus may determine if a forced failure is to be performed based on the state of a timer that is set to run for a forced failure period. When the state of the timer is "expired", the apparatus will determine that a forced failure is not to be performed in response to a password. The apparatus may include a user interface that allows a user or apparatus manager to input a value for the time period for which the timer is to run each time forced failure mode is repeated.

Another example implementation includes an apparatus that operates in either of a normal password mode or a forced failure password mode. When not in the forced failure mode, the apparatus tracks the number of consecutive incorrect passwords entered during an access attempt. If the tracking indicates that a selected number of consecutive incorrect passwords have been entered the apparatus may enter the forced failure mode of operation.

In a further example implementation a device may be configured to provide an interface for access to a network using a forced failure mode. For example, the device may include an application that provides an interface to a website or business network. When the device is in forced failure mode, the device determines if a forced failure is to be performed in response to a received password. If the device determines that a forced failure is to be performed, the apparatus forces an access failure at the apparatus. The forced failure may be presented to the users of the device as a result of an incorrect password being received at the network. For the forced failure, the device does not send the password to the website or business network. The device then repeats the receive operation and the determine operation for subsequent password entries at the apparatus. When the device determines that a forced failure is not to be performed in response to a password entry, the device may send the password to the website or business network. The website or business network may then grant or deny access depending on whether the password is correct or incorrect. The device may determine if a forced failure is to be performed, for example, based on an index tracking a number of forced failures or the state of a timer that runs for a forced failure period.

DETAILED DESCRIPTION

The system and method will now be described by use of example embodiments. The example embodiments are presented in this disclosure for illustrative purposes, and not intended to be restrictive or limiting on the scope of the disclosure or the claims presented herein.

The embodiments of the disclosure provide an additional level of password security when accessing a device or logging on to a network. The additional level of security is implemented by providing a forced failure mode of operation in which an access failure is forced for any password received, whether the password is correct or incorrect.

For example, an advantage is provided by an implementation which allows activation of a forced failure mode. The forced failure mode forces N access failures for consecutive received passwords regardless of whether the passwords are correct or incorrect. The user to which the password is assigned may have knowledge of the forced failure mode, so the user knows that N forced failures will occur before they can gain access when forced failure mode is activated. A thief or person not authorized for access may have no knowledge of the forced failure mode of operation and therefore would be at a disadvantage in attempting to guess the password.

In one implementation, an apparatus may be configured to first operate in a normal password mode. If a number M of consecutive incorrect passwords are received by the apparatus, the apparatus may then activate the forced failure mode. The forced failure mode may then force failures for the next N passwords received. Upon the N forced failures occurring, access may be granted if the next password received is correct, or if the next password is not correct, the device may return to normal mode or, in an alternative configuration, repeat forced failure mode. In a further implementation the apparatus may lock up if the next password after the N forced failures is incorrect. The implementations provide additional password security by reducing the odds that a person not authorized for access can guess the correct password or use brute force methods to find the correct password. Odds that an unauthorized person can find the correct password may be reduced by setting M and N to appropriate values. The greater N is in comparison to M, the greater the odds are against guessing the correct password. For example, in an implementation in which the apparatus locks up if the next password entered after the first N forced failures is incorrect, only M+1 guesses out of the (M+1+N) possible guesses could result in access. N guesses out of the (M+1+N) possible guesses are wasted.

For example, if a thief steals a mobile device configured according to the aforementioned implementation, the thief may attempt to gain access by guessing and entering consecutive different passwords. Upon receiving M incorrect passwords in normal mode, the mobile device will enter forced failure mode. For the next N passwords (correctly or incorrectly guessed) a forced failure will occur. After N forced failures, the thief has one chance to guess the correct password. Then, if the thief enters the incorrect password and the mobile device returns to normal password mode, the thief has M chances to guess the correct password before the mobile device enters forced failure mode again and repeats N forced failures. In an alternative configuration, if the thief enters the incorrect password after N forced failures, the mobile device may repeat forced failure mode where N forced failures again occur before the thief has a chance to guess the correct password. Also, the mobile device may be configured to wipe its data or lock out all access attempts if forced failure mode is activated a certain predetermined number of times. In each of these configurations, the greater N is in comparison to M the greater the odds are against the mobile device password being guessed correctly.

In other implementations forced failure mode may be activated by a user to be used without normal mode. For example, this may be done when the user is in an unsecure area such as an area where a large number of thefts occur. In this case, forcing N forced failure for every access attempt reduces the odds that a thief could guess the correct device password. Only 1 out of every N+1 password guesses could result in access. The other guesses would be wasted.

An advantage may also be provided by the implementations in that inadvertent device lock up or device data wiping may be avoided by use of the embodiments as compared to some commonly used methods of securing a device. These commonly used methods provide a "wipe" or "lock" feature that locks or wipes the contents of a device after a set number of incorrect passwords are entered. For example, to avoid use of methods that lock/wipe a device after M incorrect passwords are entered, the activation of forced failure mode after M incorrect passwords are entered provides additional security without using a lock/wipe feature. If a user of a device forgets their password and enters M incorrect passwords, the device will not lock or not wipe its contents but is still protected by use of the forced failure mode.

Figure 1A:
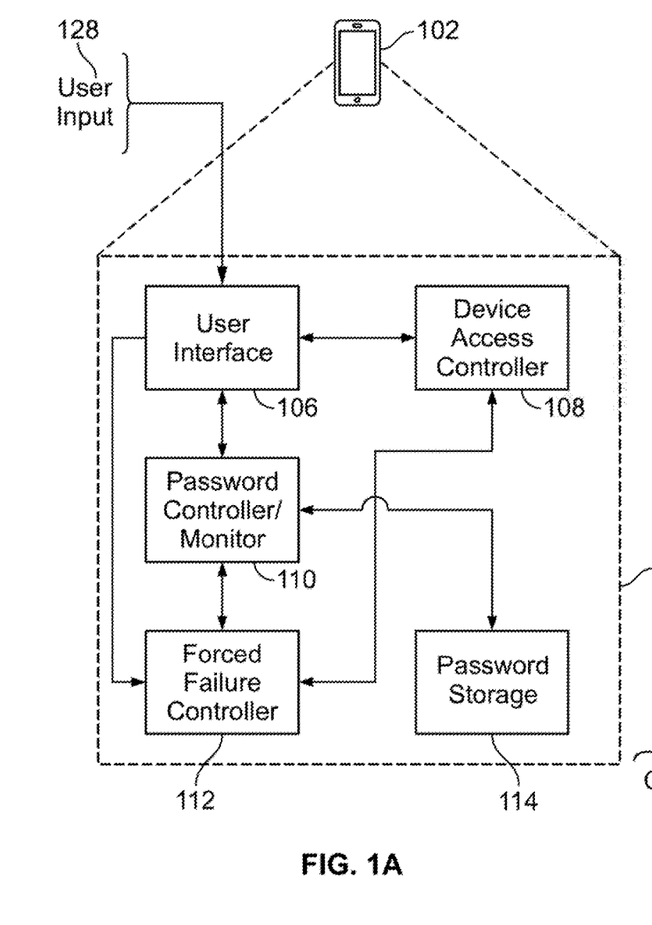
FIG. 1A is a simplified diagram illustrating portions of an example device.

FIG. 1A is a simplified diagram illustrating portions of an example apparatus which is shown as device 102. FIG. 1A shows a portion 104 of device 102 that includes functions that may be used to allow access to device 102 using a password according to an implementation of the disclosed embodiments. Device 102 may include other functions than those shown in portion 104, depending on the type of device or network in which it is used. While device 102 is illustrated as an example smart phone, device 102 may be implemented as any other type of mobile device or computing device that a user may access using a password, such as a laptop computer, tablet computing device, etc. Portion 104 of device 102 includes device access controller 108, password storage 114, forced failure controller 112, password controller/monitor 110, and user interface 106.

Figure 1B:
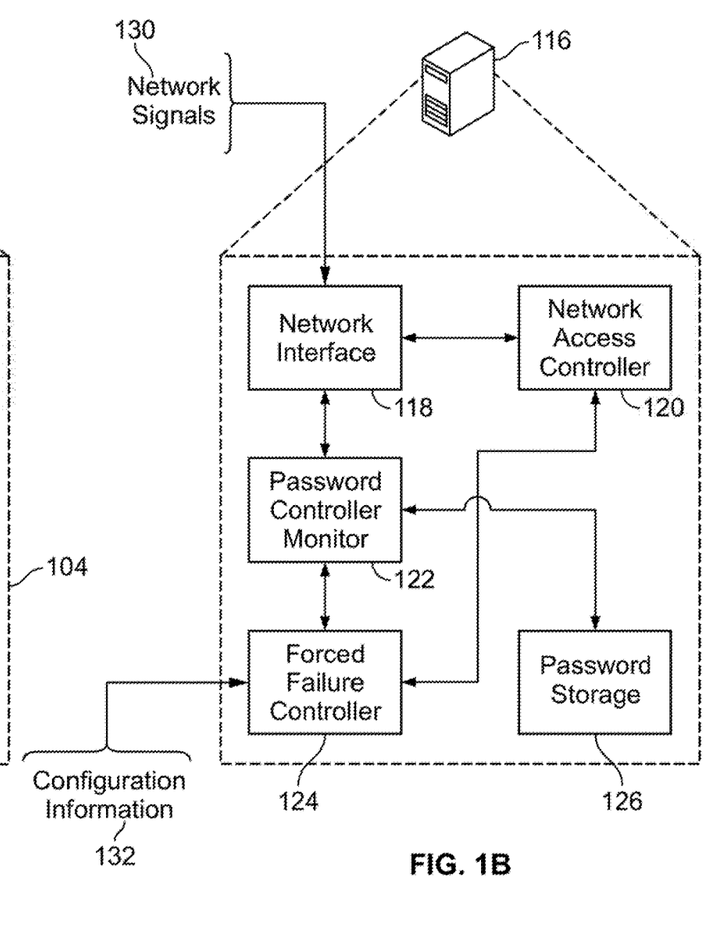
FIG. 1B is a simplified diagram illustrating portions of another example device.

FIG. 1B is a simplified diagram illustrating portions of example apparatus 116. FIG. 1A shows a portion 105 of apparatus 116 that includes functions that may be configured within apparatus 116 to allow access to a network using a password according to an implementation of the disclosed embodiments. Apparatus 116 may include other functions than those shown in portion 105, depending on the type of device or network with which it is used. While apparatus 116 is illustrated as an example server apparatus, apparatus 116 may be implemented as any type of computing apparatus or system that may be configured to control user password access to a network. Portion 105 of apparatus 116 includes network access controller 120, password storage 126, forced failure controller 124, password controller/monitor 122, and network interface 118. Apparatus 116 may be implemented to control password access for any type of network or service that may be logged using a password. For example, apparatus 116 may control logon for a work network, a commercial website, an organization's website, a social website, a personal email network, or any other password accessible network or service.

Figure 2A:
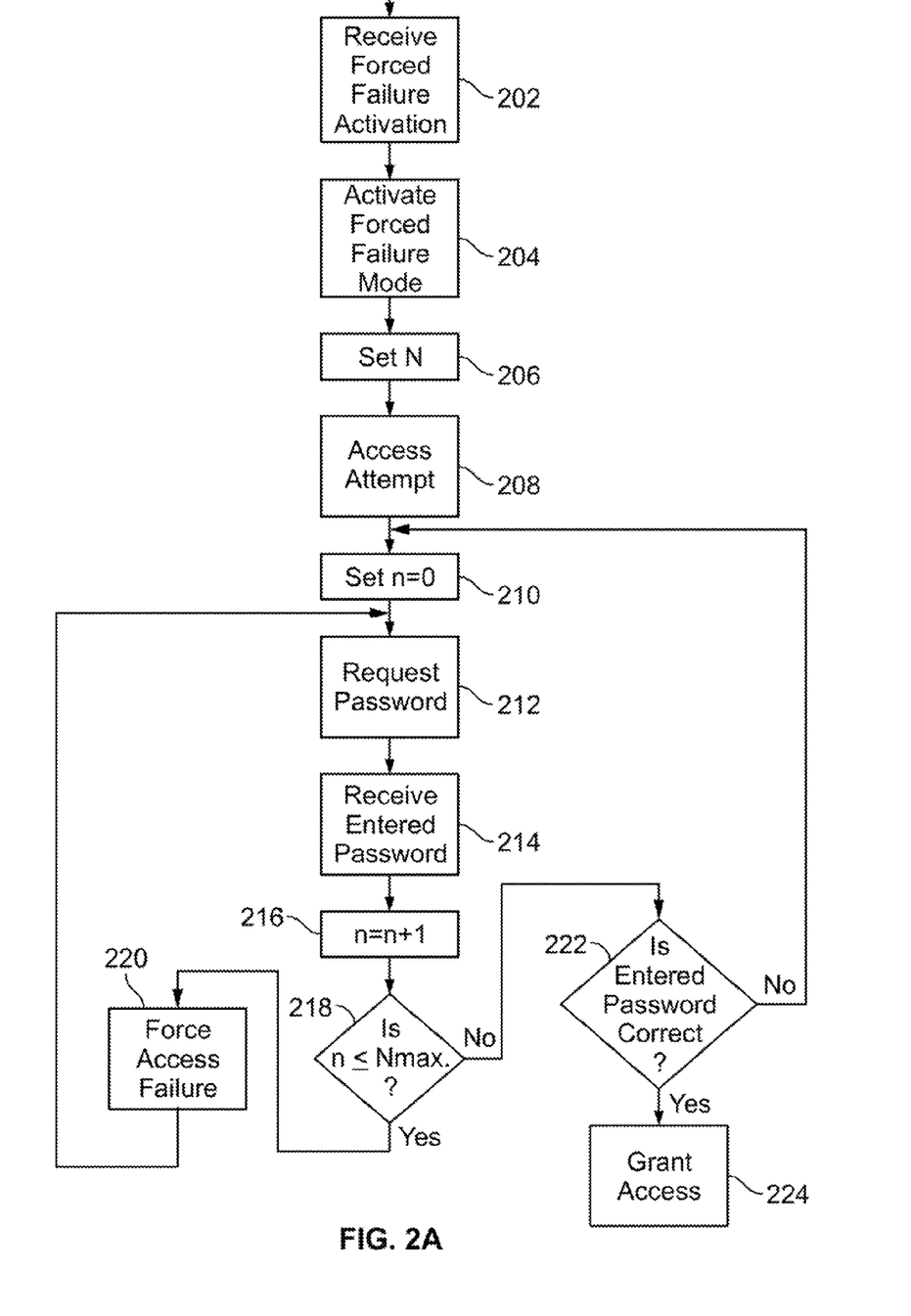
FIG. 2A is a flow diagram illustrating operations performed in an example device in password forced failure mode.

FIG. 2A is a flow diagram illustrating operations performed in an example device, such as device 102, when accessing (i.e., unlocking) the device in password forced failure mode. The operation of the functions of device 102 shown in FIG. 1A may be described in relation to an implementation of FIG. 2A.

The process begins at 202 when forced failure controller 112 receives an indication that forced failure mode is to be activated. Forced failure controller 112 may receive the indication that forced failure mode is to be activated from user interface 106 upon user interface 106 receiving user input selecting activation of forced failure mode. Alternately, forced failure controller 112 may receive the indication that forced failure mode is to be activated from device access controller 108 upon device access controller 108 determining that certain forced failure mode trigger events have occurred. For example, a predetermined number of consecutive incorrect passwords may have been entered when a device 102 is operating in a normal mode for receiving passwords for unlocking device 102.

At 204, forced failure controller 112 activates forced failure mode. Forced failure controller 112 may indicate to device access controller 108 and password controller monitor 110 that forced failure mode is activated. At 206, forced failure controller 112 determines and sets a value for a number of forced failures, N, for received passwords. The value of N may also be provided to device access controller 108. The value of N may be a value that is received from a user selection through user interface 106 and stored in forced failure controller 110 for use during forced failure mode. The value of N may also be pre-stored in device 102 upon configuration of forced failure controller 112 in device 102.

At 208, an access attempt is detected at user interface 106. The access attempt may include powering up device 102, touching the user interface 106 while the user interface 106 is in sleep mode, or any other action which indicates to device 102 that a user may desire to access the device. At 210, device access controller 108 then sets an index n to zero and at 212 requests a password by prompting the user for a password at user interface 106. The device access controller 108 may prompt for a password by displaying a password entry box and keypad at user interface 106.

At 214, device access controller 108 receives a password entered at user interface 106. Next, at 216, device access controller 108 increments index n by setting n equal to n+1. Then, at 218, device access controller 108 determines if n≤N. If n≤N, device access controller 108 moves to 220, and forces an access failure by denying access. At 220, device access controller 108 may also generate text at user interface 106 that indicates an "incorrect password" has been entered. The determination at 218 is performed regardless of whether or not the entered password received at 214 is correct or incorrect. When forced failure mode is activated all password entries will force access failure as long as n≤N. From 220 the process returns to 212 where another password may be entered.

The operations of 212, 214, 216, 218 and 220 will be repeated until it is determined, at 218, that n is greater than N, (that is, until it is determined that that relationship n≤N is not true). The determination, at 218, that n is greater than N will happen after the loop of operations 212, 214, 216, 218 and 220 has been repeated N times. Through these operations, any time the process is entered at 210, the process forces N failures for any number of password entries up to and equal to the number N.

When it is determined at 218 that n is greater than N, the process moves to 222. At 222, device access controller 108 determines if the last entered password is correct. Device access controller 108 may communicate with password controller/monitor 110, which has access to the valid password in password storage 114, to determine if the last entered password is valid. If it is determined that the last entered password is correct the process moves to 224 and device access controller 108 grants access to (unlocks) device 102. If it is determined that the last entered password is not correct, the process moves to 210 where n is set to zero and the process begins again.

In another implementation of FIG. 2A, the operations shown in the flow diagram may also be performed by an apparatus, such as apparatus 116. In this implementation, apparatus 116 may be configured to control access to a network account using a password according to the disclosed embodiments. The operation of the functions of apparatus 116 shown in FIG. 1B may be described in relation to an implementation of FIG. 2A.

The process performed in apparatus 116 begins at 202 when forced failure controller 124 receives an indication that forced failure mode is to be activated. Forced failure controller 124 may receive the indication that forced failure mode is to be activated for an account in the form of configuration information 132 received from, for example, a management dashboard operated by a manager of the network to which apparatus 116 controls access. Forced failure controller 124 may also receive the indication that forced failure mode is to be activated through a control signal included in network signals 130 received at network interface 118. Alternately, forced failure controller 124 may receive the indication that forced failure mode is to be activated from device access controller 120 upon device access controller 124 determining that certain forced failure mode trigger events have occurred. For example, a predetermined number of consecutive incorrect passwords for a network account may have been received in network signals 130 at network interface 118 when apparatus 116 is operating in a normal access mode.

At 204, forced failure controller 124 activates forced failure mode. Forced failure controller 124 may indicate to network access controller 120 and password controller/monitor 122 that forced failure mode is activated. At 206, forced failure controller 124 determines and sets a value for a number of forced failures, N, for received passwords. The value of N may also be provided to network access controller 120. The value of N may be a value that is received from a network manager's selection included in configuration information 132 and stored in forced failure controller 124 for use during forced failure mode. The value of N may also be pre-stored upon configuration of forced failure controller 124 in device 116 or received in a control signal for forced failure controller 124 that is included in network signals 130 received at network interface 118.

At 208, an attempt for access to the account is detected at network interface 118. The access attempt may include, for example, receiving an indication included in network signals 132 that a user of a device communicating with apparatus 116 has clicked on a "logon" icon display on a web page or initiated a logon by another method. At 210, network access controller 120 then sets an index n to zero and at 212 initiates a request for a password causing the user to receive a prompt requesting that the user of the device communicating with apparatus 116 enter a password at the device.

At 214, network access controller 120 receives a password entered at the device communicating with apparatus 116 at network interface 118. Next, at 216, device access controller 120 increments index n by setting n equal to n+1. Then, at 218, device access controller 120 determines if n≤N. If n≤N, device access controller 120 moves to 220, forces an access failure and denies access. At 220, device access controller 120 may also initiate the display of a message to the user of the device communicating with apparatus 116 that indicates an "incorrect password" has been entered. The determination at 218 is performed regardless of whether or not the entered password received at 214 is correct or incorrect. When forced failure mode is activated all received passwords for the account will force access failure as long as n≤N. From 220 the process returns to 212 where another password may be received.

The operations of 212, 214, 216, 218 and 220 will be repeated until it is determined, at 218, that n is greater than N, (that is, until it is determined that that relationship n≤N is not true). The determination, at 218, that n is greater than N will happen after the loop of operations 212, 214, 216, 218 and 220 has been repeated N times. Through these operations, any time the process is entered at 210, the process forces N failures for any number of received passwords for the account up to and equal to the number N.

When it is determined at 218 that n is greater than N, the process moves to 222. At 222, network access controller 120 determines if the last received password is correct. Device access controller 120 may communicate with password controller/monitor 122, which has access to the valid password in password storage 126, to determine if the last entered password is valid. If it is determined that the last received password is correct the process moves to 224 and device access controller 120 grants access to the account. If it is determined that the last entered password is not correct, the process moves to 210 where n is set to zero and the process begins again.

Figure 2B:
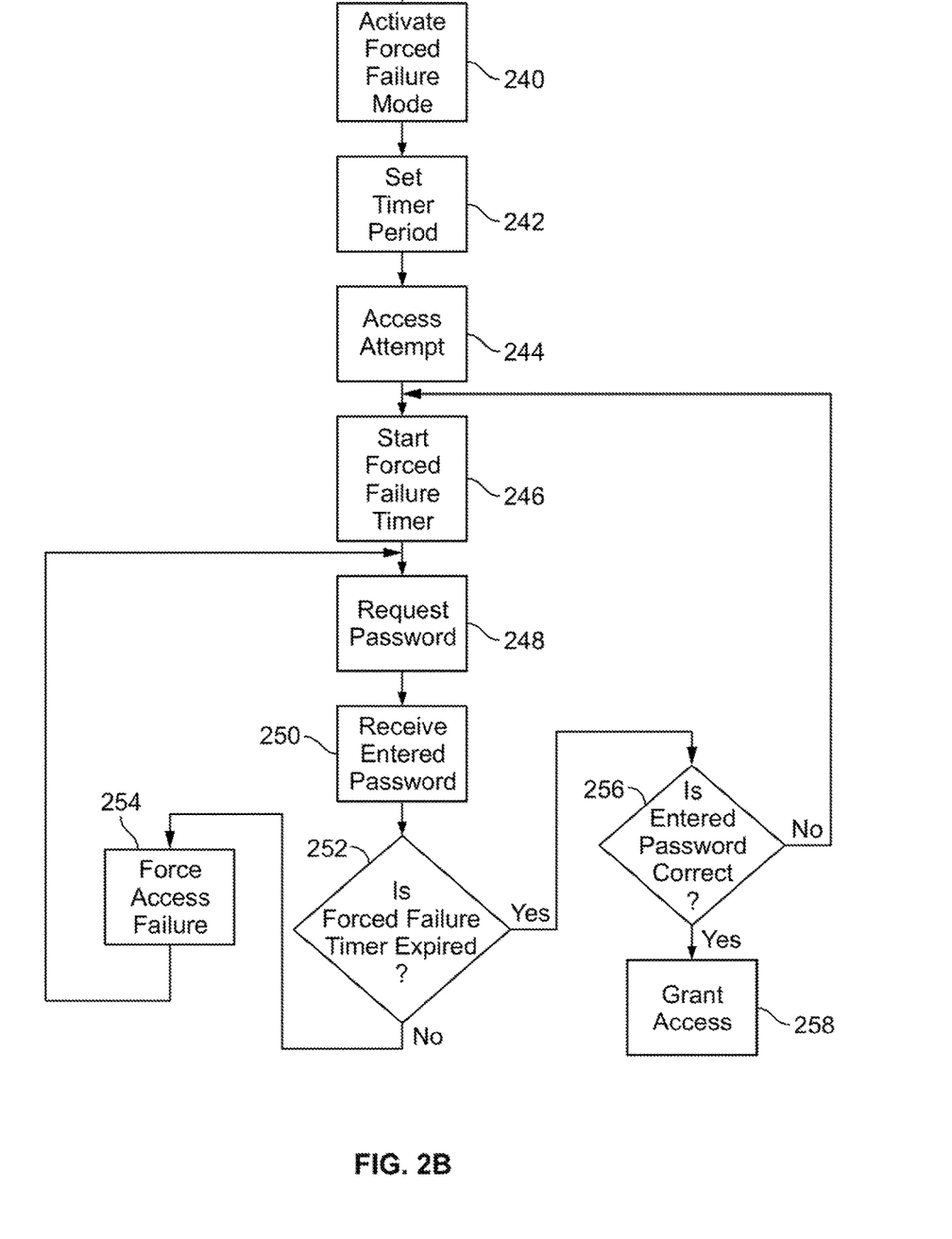
FIG. 2B is a flow diagram illustrating further operations performed in an example device in password forced failure.

FIG. 2B is a flow diagram illustrating further operations performed in an example device in password forced failure mode. The process of FIG. 2B is similar to the process of FIG. 2A, with the difference being that the process of FIG. 2B uses a forced failure timer to determine whether or not to force a failure in response to a received password.

In an implementation of FIG. 2B, the process of FIG. 2B may be performed in device 102 and the process may be described in relation FIG. 1A. The process begins at 240 when forced failure controller 112 receives an indication that forced failure mode is to be activated and activates forced failure mode. Forced failure controller 112 may receive the indication that forced failure mode is to be activated from user interface 106 upon user interface 106 receiving user input selecting activation of forced failure mode. Alternately, forced failure controller 112 may receive the indication that forced failure mode is to be activated from device access controller 108 upon device access controller 108 determining that certain forced failure mode trigger events have occurred. For example, a predetermined number of consecutive incorrect passwords may have been entered when a device 102 is operating in a normal mode for receiving passwords for unlocking device 102. Forced failure controller 112 may indicate to device access controller 108 and password controller monitor 110 that forced failure mode is activated. At 242 device access controller 108 sets the value of a forced failure timer period according to information stored in forced failure controller 112. The value of the timer period may be a value that is received from a user selection through user interface 106 and stored in forced failure controller 112 for use during forced failure mode. The value of the timer period may also be pre-stored in device 102 upon configuration of forced failure controller 112.

At 244, an access attempt is detected at user interface 106. The access attempt may include powering up device 102, touching the user interface 106 while the user interface 106 is in sleep mode, or any other action which indicates to device 102 that a user may desire to access the device. At 246, device access controller 108 then starts a forced failure timer. The forced failure timer may be set to run for the time period set in 242. Any password received when the timer is running will result in a forced failure.

At 248 device access controller 108 requests a password by prompting the user for a password at user interface 106. The device access controller 108 may prompt for a password by displaying a password entry box and keypad at user interface 106. At 250, device access controller 108 receives a password entered at user interface 106. Then, at 252, device access controller 108 determines if the forced failure timer has expired. If the forced failure timer has not expired device access controller 108 moves to 254, and forces an access failure by denying access. At 254, device access controller 108 may also generate text at user interface 106 that indicates an "incorrect password" has been entered. The determination at 252 is performed regardless of whether or not the entered password received at 214 is correct or incorrect. When forced failure mode is activated all password entries will force access failure as long as the forced failure time is not expired. From 254 the process returns to 248 where another password may be entered.

The operations at 248, 250, 252, and 254 are repeated until it is determined at 252 that the forced failure timer has expired. Through these operations, any time the process is entered at 248, the process forces failures until the forced failure timer expires. When a password is received and it is determined, at 254, that the forced failure timer is expired the process moves to 256. At 256, device access controller 108 determines if the last password entered at 248 is correct. Device access controller 108 may communicate with password controller/monitor 110, which has access to the valid password in password storage 114, to determine if the last entered password is valid. If it is determined that the last entered password is correct the process moves to 258 and device access controller 108 grants access to (unlocks) device 102. If it is determined that the last entered password is not correct, the process moves to 246 where the forced failure timer is reset to the forced failure period and the process begins again.

In another implementation of FIG. 2B, the operations shown in the flow diagram may also be performed by an apparatus, such as apparatus 116. In this implementation, apparatus 116 may be configured to control access to a network account using a password according to the disclosed embodiments. The operation of the functions of apparatus 116 shown in FIG. 1B may be described in relation to an implementation of FIG. 2B.

The process performed in apparatus 116 begins at 240 when forced failure controller 124 receives an indication that forced failure mode is to be activated. Forced failure controller 124 may receive the indication that forced failure mode is to be activated for an account according to configuration information 132 received from, for example, a management dashboard operated by a manager of the network to which apparatus 116 controls access. Forced failure controller 112 may also receive the indication that forced failure mode is to be activated through a control signal included in network signals 130 received at network interface 118. Alternately, forced failure controller 124 may receive the indication that forced failure mode is to be activated from device access controller 120 upon device access controller 124 determining that certain forced failure mode trigger events have occurred. For example, a predetermined number of consecutive incorrect passwords for a network account may have been received in network signals 130 at network interface 118 when apparatus 116 is operating in a normal access mode. Forced failure controller 124 may indicate to network access controller 120 and password controller/monitor 122 that forced failure mode is activated. At 242 network access controller 120 sets the value of a forced failure timer period according to information stored in forced failure controller 124. The value of the timer period may be a value that is received in configuration information 132 received from, for example, a management dashboard operated by a manager of the network to which apparatus 116 controls access.

At 244, an attempt for access to the account is detected at network interface 118. The access attempt may include, for example, receiving an indication included in network signals 132 that a user of a device communicating with apparatus 116 has clicked on a "logon" icon display on a web page or initiated a logon by another method. At 246, network access controller 120 then starts a forced failure timer. The forced failure timer may be set to run for a time period. Any password received when the timer is running will result in a forced failure.

At 248 network access controller 120 initiates a request for a password. The request causes the user to receive a prompt requesting that the user of the device communicating with apparatus 116 enter a password at the device. At 250, network access controller 120 receives a password entered at the device communicating with apparatus 116 and sent through network interface 118. Next, at 252, network access controller 120 determines if the forced failure timer has expired. If the forced failure timer has not expired network access controller 120 moves to 254, and forces an access failure by denying access. At 254, network access controller 120 may also initiate the display of a message to the user of the device communicating with apparatus 116 that indicates an "incorrect password" has been entered. The determination at 252 is performed regardless of whether or not the entered password received at 250 is correct or incorrect. When the forced failure timer is running all received passwords for the account will force access failure.

From 254 the process returns to 248 where another password may be received. The operations at 248, 250, 252, and 254 are repeated until it is determined, at 252 that the forced failure timer has expired. Through these operations, any time the process is entered at 248, the process forces failures until the forced failure timer expires.

When a password is received and it is determined, at 254, that the forced failure timer is expired the process moves to 256. At 256, network access controller 120 determines if the last password entered at 248 is correct. Device access controller 120 may communicate with password controller/monitor 122, which has access to the valid password in password storage 126, to determine if the last entered password is valid. If it is determined that the last entered password is correct the process moves to 258 and network access controller 120 grants access to the account. If it is determined that the last entered password is not correct, the process moves to 246 where the forced failure timer is reset to the forced failure period and the process begins again.

Figure 3A:
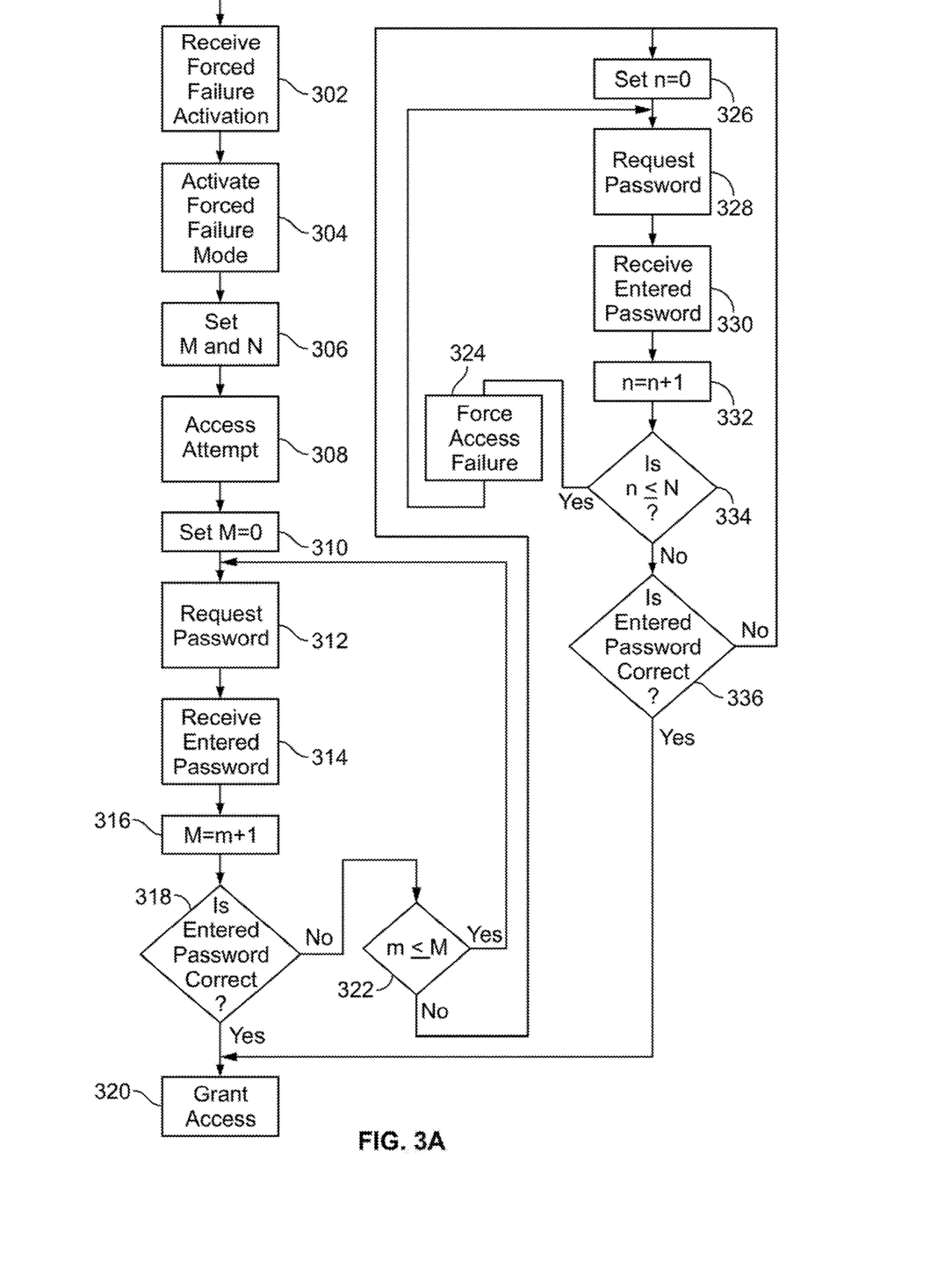
FIG. 3A is a flow diagram illustrating operations performed in an example device to trigger password forced failure mode.

FIG. 3A is a flow diagram illustrating operations performed in an example device to trigger password forced failure. The operations of FIG. 3A may be performed when device 102 is being accessed (unlocked) with a password.

The operations of FIG. 3A performed in device 102 may be described in relation to FIG. 1A. The process begins at 302 when forced failure controller 112 receives an indication that normal-to-forced failure mode is to be activated. Forced failure controller 112 may receive the indication that normal-to-forced failure mode is to be activated from user interface 106 upon user interface 106 receiving user input selecting activation of normal-to-forced failure mode.

At 304, forced failure controller 304 activates normal-to-forced failure mode. Forced failure controller 112 may indicate to device access controller 108 and password controller monitor 110 that normal-to-forced failure mode is activated. At 306, forced failure controller 112 determines a value for a number of incorrect passwords M that, if received in normal mode will trigger forced failure mode. At 302, forced failure controller also determines a value for a number of forced failures, N, for received passwords to be used in forced failure mode. The values of M and N may also be provided to device access controller 108. The values of M and N may be received from a user selection through user interface 106 and stored in forced failure controller 110 for use during forced failure mode. The values of M and N may also be pre-stored in device 102 upon configuration of forced failure controller 112 in device 102.

At 308, an access attempt is detected at user interface 106. The access attempt may include powering up device 102, touching the user interface 106 while the user interface 106 is in sleep mode, or any other action which indicates to device 102 that a user may desire to access the device. At 310, device access controller 108 then sets an index m to zero and at 312 requests a password by prompting the user for a password at user interface 106. The device access controller 108 may prompt for a password by displaying a password entry box and keypad at user interface 106.

At 314, device access controller 108 receives a password entered at user interface 106. Next, at 316, device access controller 108 increments index m by setting m equal to m+1. Then, at 318, device access controller 108 determines if the password is correct. If it is determined that the password is correct the process moves to 320 and device access controller 108 grants access to(unlocks) device 102. If it is determined that the last entered password is not correct, the process moves to 322 where it is determined if m≤M. If m≤M the process returns to 312, where a password is again requested by displaying notification of "incorrect password" to the user.

The operations of 312-318 will be repeated until a correct password is received and device access is granted at 320, or until M incorrect passwords are received. If M incorrect passwords are received forced failure mode is activated, and the process moves from 322 to 326.

Forced failure operations 326, 328, 330, 332, 334, 336, and 324 of FIG. 3A are then performed in the same manner as operations 210, 212, 214, 216, 218, 222, and 220 of FIG. 2A. In the implementation of FIG. 3A the process repeats forced failure mode if an incorrect password is found at 336. In other implementations, the process may move from 336 to 310, each time an incorrect password is found at 336, to repeat the operations of regular mode before forced failure mode is entered again from 322.

The operations shown in the flow diagram of FIG. 3A may also be performed by an apparatus, such as apparatus 116 of FIG. 1B that controls access to a network with similar forced failure functions as device 102. In this case, the passwords would be received in network signals 130 at network interface 118. M and N may also be input by a network manager in configuration information 132 received from a network management dashboard.

Figure 3B:
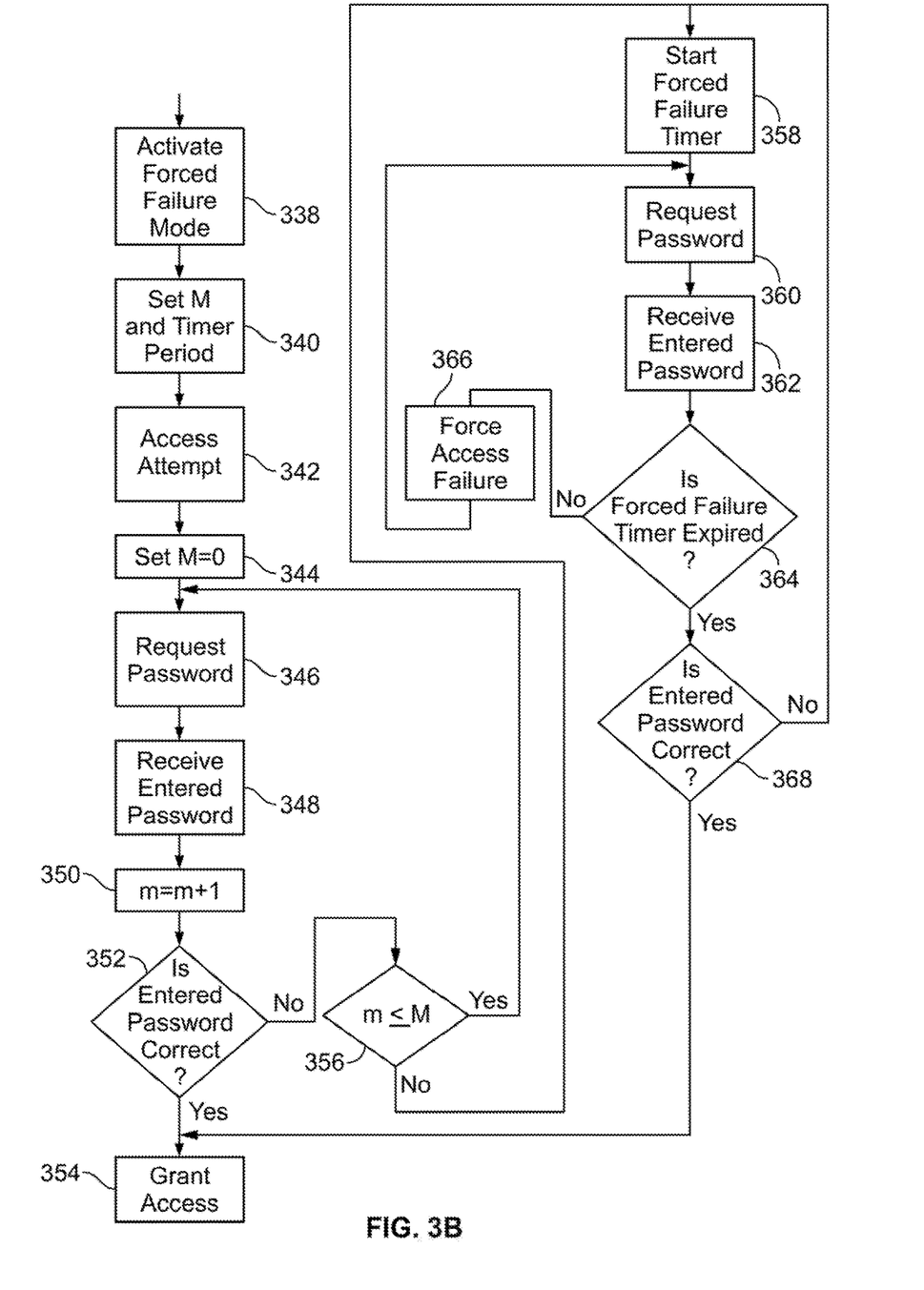
FIG. 3B is a flow diagram illustrating further operations performed in an example device to trigger password forced failure mode.

FIG. 3B is a flow diagram illustrating further operations performed in an example device to trigger password forced failure mode. The process of FIG. 3B is similar to the process of FIG. 3A, except a forced failure timer is used instead of an index n and a desired number N of forced failures to determine whether or not a failure should be forced for an entered password. In FIG. 3B operations 338-356 are performed similar to 302-322 of FIG. 3A, except a value for a forced failure timer period is set at 340 instead of setting the value N. Then, at 356, if M incorrect passwords are determined to have been entered, the process moves to 358 and begins forced failure mode. Forced failure operations 358, 360, 362, 364, 368, and 366 of FIG. 3B are then performed in the same manner as operations 246, 248, 250, 252, 256, and 254 of FIG. 2A. In the implementation of FIG. 3B the process repeats forced failure mode if an incorrect password is found at 368 and the forced failure timer is not expired. In other implementations, the process may move from 368 to 344, each time an incorrect password is found at 368, to repeat the operations of regular mode before forced failure mode is entered again from 356. Similar to the process of FIGS. 2A-2B and 3A, the process of FIG. 3B may be also performed in example device 102 or apparatus 116 of, respectively, FIGS. 1A and 1B.

An implementation of password forced failure may also be implemented on a device to provide extra security for networks or accounts accessed from the device. For example, the device may include an application that provides an interface to a website or business network. In one configuration, a particular bank may be associated with an application on the device that may be selected to logon to a bank account. A password for a user's bank account may then be entered at the interface to logon to the user account. In one example, the application may perform a process similar to that of FIG. 2A with the difference being that operation 222 is not performed at the device. Instead, in this implementation, operations 202-220 will be performed for passwords received at the interface until N forced failures have occurred. Then, when N forced failures have occurred, the device may send the password to the website or business network which performs operation 222. The website or business network may then grant or deny access depending on whether the password is correct or incorrect. If the password is incorrect the process may be repeated. When a device is stolen and a thief attempts to access accounts through applications on the device, this may provide extra security through the forced failure.

Figure 4:
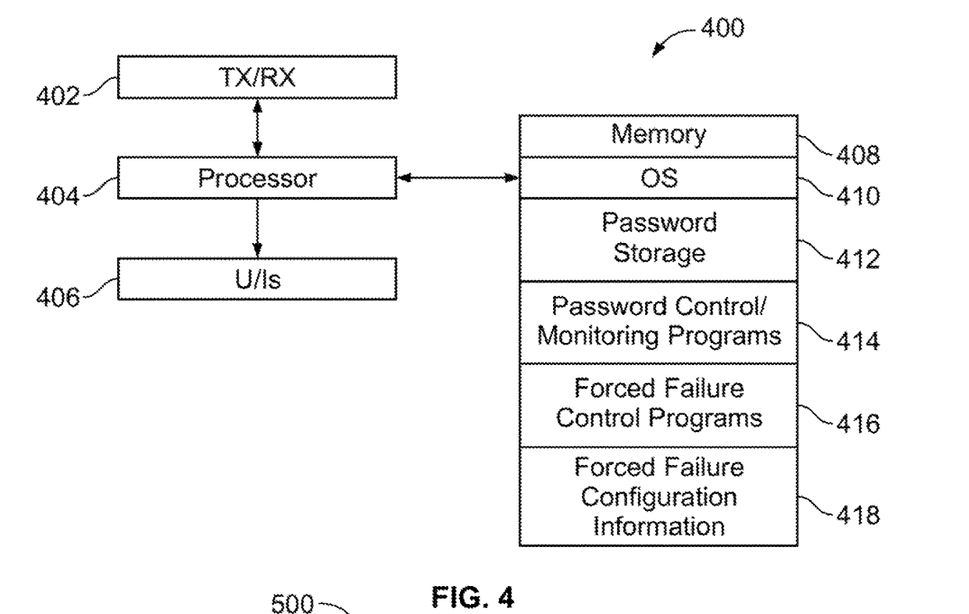
FIG. 4 is a simplified block diagram illustrating an example device.

FIG. 4 shows a simplified block diagram of an example device 400. For example, the functions of device 102 of FIG. 1A may be implemented on a device such as device 400. In example implementations, device 400 may be any type of device that requires a password or passcode to unlock the device for access. For example, device 400 may be implemented in a smart phone, a tablet computer, a desktop computer, laptop computer device, gaming devices, an augmented reality (AR) device, media devices, smart televisions, multimedia cable/television boxes, smart phone accessory devices, tablet accessory devices, or personal digital assistants (PDAs). Device 400 may also be implemented as a device in a security system, storage safe, automobile locking/security system, or any other system that makes use of passwords.

Device 400 may include a processor 404, memory 408, user interfaces (U/IS) 406, and transceivers (TX/RX) 402. Transceivers TX/RX 402 may include cellular or Wi-Fi transceivers, short range transceivers such as Bluetooth or Wi-Fi Direct transceivers, optical transceivers, or any other type of transceivers that allow communication with a network or other devices. In some implementations, device 400 may also be implemented without transceivers (TX/RX) 402. User interfaces 406 may include any type of interface such as a touchscreen, a keypad, a voice controlled interface, interfaces that are gesture or motion based, an interface that receives input wirelessly, or any other type of interface that allows a user to access or unlock the device using a password according to the disclosed embodiments.

Memory 408 may be implemented as any type of computer readable storage media, including non-volatile and volatile memory. Memory 408 is shown as including code for device operating system (OS) 410, password storage 412, password control/monitoring programs 414, forced failure control programs 416, and device access control programs 418. Processor 404 may comprise one or more processors, or other control circuitry, or any combination of processors and control circuitry. Processor 404 provides overall control of device 400 by executing the code in memory 408 in to implement the functions for providing forced failure according to the disclosed embodiments. In implementations of device 400, processor 404 may execute code in memory 408 to execute the functions shown in FIG. 1A that are described in relation to FIGS. 2A-2B and FIGS. 3A-3B. Operating system (OS) 410 provides overall control of device 102, including functions that may provide the user interface 106 of FIG. 1A. Device access control programs 418 and forced failure control programs 416 may cause processor 404 to control device 400 to provide functions described for device access controller 108 and forced failure controller 112 of FIG. 1A. Password storage 412 may provide the functions described for password storage 114 of FIG. 1A. Password control/monitoring programs 414 may provide the functions described for password controller/monitor 110 of FIG. 1A.

Figure 5:
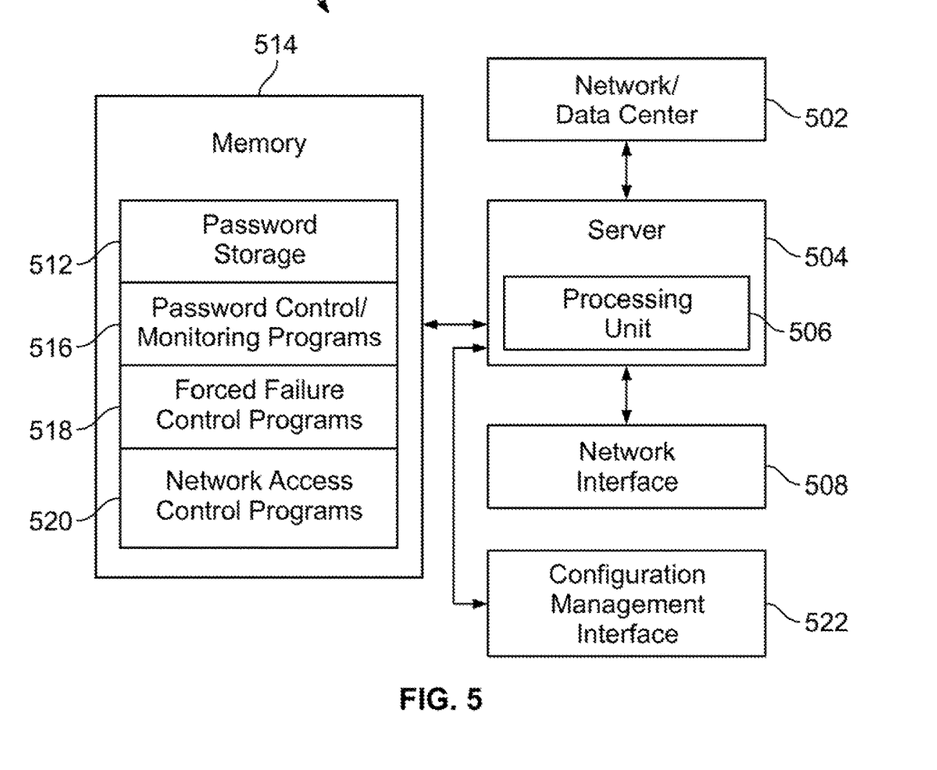
FIG. 5 is a simplified block diagram illustrating an example apparatus in a network.

FIG. 5 shows a simplified block diagram of an example apparatus 500. For example, the functions of apparatus 116 shown in FIG. 1B may be implemented on an apparatus such as apparatus 500. Apparatus 500 may be implemented in a network to control logon to the network or to a network service.

Apparatus 500 includes a server 504 having processing unit 506, a memory 514, interfaces to other networks 508, and Network/data center interfaces 502. The interfaces to other networks 508 allow apparatus 115 to receive communications, such as passwords from remote devices accessing the network to which apparatus 116 controls access. Network/data center interfaces 502 allow apparatus 120 to communicate with the network or data center to which apparatus 116 controls access and which includes an account or service associated with a user's password. Memory 514 may be implemented as any type of computer readable storage media, including non-volatile and volatile memory. Memory 514 is shown as including password storage 512, password control/monitoring programs 516, forced failure control programs 518, and network access control programs 520. Server 504 and processing unit 506 may comprise one or more processors, or other control circuitry, or any combination of processors and control circuitry that provide overall control of apparatus 500 according to the disclosed embodiments.

Network access control programs 520 and forced failure control programs 518 may cause processing unit 506 to control device 500 to provide functions described for network access controller 120 and forced failure controller 124 of FIG. 1B. Password storage 512 may provide the functions described for password storage 126 of FIG. 1B. Password control/monitoring programs 514 may provide the functions described for password controller/monitor 122 of FIG. 1B.

Apparatus 500 is shown as including server 504 as a single server. However, server 504 may be representative of server functions or server systems provided by one or more servers or computing devices that may be co-located or geographically dispersed to implement apparatus 500. The term server as used in this disclosure is used generally to include any computing devices or communications equipment that maybe implemented to perform logon using turn-varying passwords according to the disclosed embodiments.

The example embodiments disclosed herein may be described in the general context of processor-executable code or instructions stored on memory that may comprise one or more computer readable storage media (e.g., tangible non-transitory computer-readable storage media such as memory 408 or 514). As should be readily understood, the terms "computer-readable storage media" or "non-transitory computer-readable media" include the media for storing of data, code and program instructions, such as memory 408 or 514, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

The disclosed embodiments include an apparatus comprising one or more processors and memory in communication with the one or more processors, the memory comprising code that, when executed, causes the one or more processors to control the device to receive a password for an access, determine if a parameter indicates that a forced failure is to be performed in response to the received password, and, if the parameter indicates a forced failure response is to be performed, force an access failure, and repeat the receive and the determine operations, and, if the parameter does not indicate a forced failure response is to be performed, grant the access if the password is correct. The parameter may comprise an index tracking a number of forced failures. The apparatus may determine if the parameter indicates a forced failure is to be performed in response to the received password by determining if the index indicates that a selected number of forced failures have been performed. The apparatus may include a user interface in communication with the one or more processors, and the code may further causes the one or more processors to control the apparatus to receive input indicating the selected number of forced failures at the user interface and store the selected number of forced failures in the memory. The code may further cause the one or more processors to receive the password for an access by controlling the apparatus to receive the password for an access, and, increment the index tracking forced failures in response to receiving the password. The parameter may comprise the state of a timer that runs for a forced failure period. The apparatus may determine if the parameter indicates a forced failure is to be performed in response to the received password by determining if the state of the timer is active. The apparatus may include a user interface in communication with the one or more processors, and the code may further cause the one or more processors to control the apparatus to receive a value for the period for which the timer is to run. The apparatus comprises a device and the access may comprise unlocking the device. The apparatus may comprise a device controlling a network, and the access may comprise access to the network. The receive and determine operations may be performed while the apparatus is in a second mode of operation, and the code may cause the one or more processors, while the apparatus is in a first mode of operation, to control the apparatus to determine if an incorrect password has been received for the access while in the first mode, increment an index tracking incorrect passwords if an incorrect password has been received, determine if the index tracking incorrect passwords indicates that a selected number of incorrect passwords has been reached, and, activate the second mode of operation if the selected number of incorrect passwords has been reached.

The disclosed embodiments also include a method comprising receiving a password for an access at an apparatus, determining if a parameter stored in the apparatus indicates that a forced failure is to be performed in response to the received password, and, if the parameter indicates that a forced failure is to be performed in response to the received password, forcing an access failure, and repeating the receiving and the determining operations, and, if the parameter does not indicate that a forced failure is to be performed in response to the received password, granting the access if the password is correct. The parameter may comprise an index tracking a number of forced failures and the determining if the parameter indicates that a forced failure is to be performed in response to the received password may comprise determining if the index indicates that a selected number of forced failures have been performed. The parameter may comprise the state of a timer that runs for a forced failure period and the determining if the parameter indicates that a forced failure is to be performed in response to the received password may comprise determining if the state of the timer is active. The receiving and determining operations may be performed while the apparatus is in a second mode of operation, and the method may comprise, while the apparatus is in a first mode of operation determining if an incorrect password has been received for the access, incrementing, if an incorrect password has been received, an index tracking incorrect passwords, determining if the index tracking incorrect passwords indicates that a selected number of incorrect passwords has been reached, and, activating the second mode of operation if the selected number of incorrect passwords has been reached.

The disclosed embodiments further include a device comprising one or more processors and memory in communication with the one or more processors, the memory comprising code that, when executed, causes the one or more processors to control the device to provide an interface for access to a network, receive a password at the interface, determine if a parameter indicates a forced failure is to be performed in response to the received password, and, if the parameter indicates the forced failure response, force an access failure at the device, and repeat the receive, the increment, and the determine operations, and, if the parameter does not indicate a forced failure response, send the password from the device to the network. The parameter may comprise an index tracking a number of forced failures. The parameter may comprise the state of a timer that runs for a forced failure period. The device may comprise a mobile device and the code may comprise an application downloaded to the mobile device.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLD s), etc. Use of the term processor or processing unit in this disclosure is meant to include all such implementations.

Also, although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus comprising:
   one or more processors; and,
   memory in communication with the one or more processors, the memory comprising code that, when executed, causes the one or more processors to control the apparatus to:
     receive a password for access;
     determine if an index tracking a number of forced failures that have been previously performed indicates that a forced failure is to be performed in response to the received password by determining if the index is less than a desired number of forced failures wherein the forced failure comprises an access failure that is forced for any password received, whether the password is correct or incorrect; and,
     if the index indicates a forced failure is to be performed:
       force an access failure;
         increment the index, and,
         repeat the receive and the determine operations; or,
     if the index does not indicate a forced failure is to be performed:
       grant the access if the password is correct.

2. The apparatus of claim 1, wherein apparatus includes a user interface in communication with the one or more processors, and the code further causes the one or more processors to control the apparatus to receive input indicating the desired number of forced failures at the user interface and store the selected number of forced failures in the memory.

3. The apparatus of claim 1, wherein the code further causes the one or more processors to receive the password for access by controlling the apparatus to increment the index tracking the number of forced failures in response to receiving the password.

4. The apparatus of claim 1, wherein the apparatus comprises a device and the access comprises unlocking the device.

5. The apparatus of claim 1, wherein the apparatus comprises a device controlling a network, and the access comprises access to the network.

6. The apparatus of claim 1, wherein the receiving and determining are performed while the apparatus is in a second mode of operation, and the code further causes the one or more processors, while the apparatus is in a first mode of operation, to control the apparatus to:
   determine if an incorrect password has been received for the access while in the first mode;
   increment an index tracking incorrect passwords if an incorrect password has been received;
   determine if the index tracking incorrect passwords indicates that a selected number of incorrect passwords has been reached; and,
   activate the second mode of operation if the selected number of incorrect passwords has been reached.

7. A method comprising:
   determining if an index tracking a number of forced failures that have been previously forced indicates that a forced failure is to be performed in response to the received password by determining if the index is less than a desired number of forced failures, wherein the forced failure comprises an access failure that is forced for any password received, whether the password is correct or incorrect: and,
   if the index indicates a forced failure is to be performed:
     forcing an access failure;
     incrementing the index; and,
     repeating the receiving and the determining operations; or
   if the parameter index does not indicate a forced failure is to be performed: granting the access if the password is correct.

8. The method of claim 7, wherein the receiving and determining are performed while the apparatus is in a second mode of operation, and the method further comprises, while the apparatus is in a first mode of operation:
   determining if an incorrect password has been received for the access;

incrementing, if an incorrect password has been received, an index tracking incorrect passwords;
determining if the index tracking incorrect passwords indicates that a selected number of incorrect passwords has been reached; and,
activating the second mode of operation if the selected number of incorrect passwords has been reached.

9. A device comprising: one or more processors; and memory in communication with the one or more processors, the memory comprising code that, when executed, causes the one or more processors to control the device to:
provide an interface for access to a network;
receive a password at the interface;
determine if an index tracking a number of forced failures that have been previously forced indicates that a forced failure is to be performed in response to the received password by determining if the index is less than a desired number of forced failures, wherein the forced failure comprises an access failure that is forced for any password received, whether the password is correct or incorrect; and,
if the index indicates the forced failure response is to be performed:
force an access failure at the device;
increment the index; and,
repeat the receive and the determine operations; or,
if the index does not indicate a forced failure response is to be performed:
send the password from the device to the network.

10. The device of claim 9, wherein the device comprises a mobile device and the code comprises an application on the mobile device.

* * * * *